(12) United States Patent
Ito

(10) Patent No.: US 7,479,166 B2
(45) Date of Patent: Jan. 20, 2009

(54) METHOD OF MANUFACTURING SOLID ELECTROLYTIC CAPACITOR

(75) Inventor: Tadahito Ito, Neyagawa (JP)

(73) Assignees: SANYO Electric Co., Ltd., Moriguchi-shi (JP); SUN Electronic Industries Corp., Shijonawate-shi (JP)

(*) Notice: Subject to any disclaimer, the term of this patent is extended or adjusted under 35 U.S.C. 154(b) by 11 days.

(21) Appl. No.: 11/723,211

(22) Filed: Mar. 19, 2007

(65) Prior Publication Data

US 2008/0086859 A1    Apr. 17, 2008

(30) Foreign Application Priority Data

Oct. 12, 2006    (JP) .............................. 2006-278473

(51) Int. Cl.
*H01G 9/00* (2006.01)
(52) U.S. Cl. ...................... 29/25.03; 361/508; 361/528; 361/540; 257/E21.008
(58) Field of Classification Search .................. None
See application file for complete search history.

(56) References Cited

U.S. PATENT DOCUMENTS

2007/0171597 A1* 7/2007 Merker et al. ............... 361/523

FOREIGN PATENT DOCUMENTS

JP    11-121279 A    4/1999

* cited by examiner

*Primary Examiner*—N Drew Richards
*Assistant Examiner*—Kyoung Lee
(74) *Attorney, Agent, or Firm*—Westerman, Hattori, Daniels & Adrian, LLP.

(57) ABSTRACT

A method of manufacturing a solid electrolytic capacitor is provided for which an electrolytic polymerization solution can be used semipermanently while preventing a decrease in electrical conductivity of an electrically conductive polymer layer and an increase in ESR of the resultant electrolytic capacitor due to degradation of the electrolytic polymerization solution. The method of manufacturing a solid electrolytic capacitor as provided includes the step (A) of forming a dielectric layer on a surface of an anode element made of a valve metal, the step (B) of forming a cathode layer including an electrically conductive polymer layer on the dielectric layer, and the step (C) of adjusting the pH of a solution that contains a monomer and a dopant agent and that is used in forming the conductive polymer layer, by allowing the solution to contact an ion exchange or ion capture substance.

7 Claims, 1 Drawing Sheet

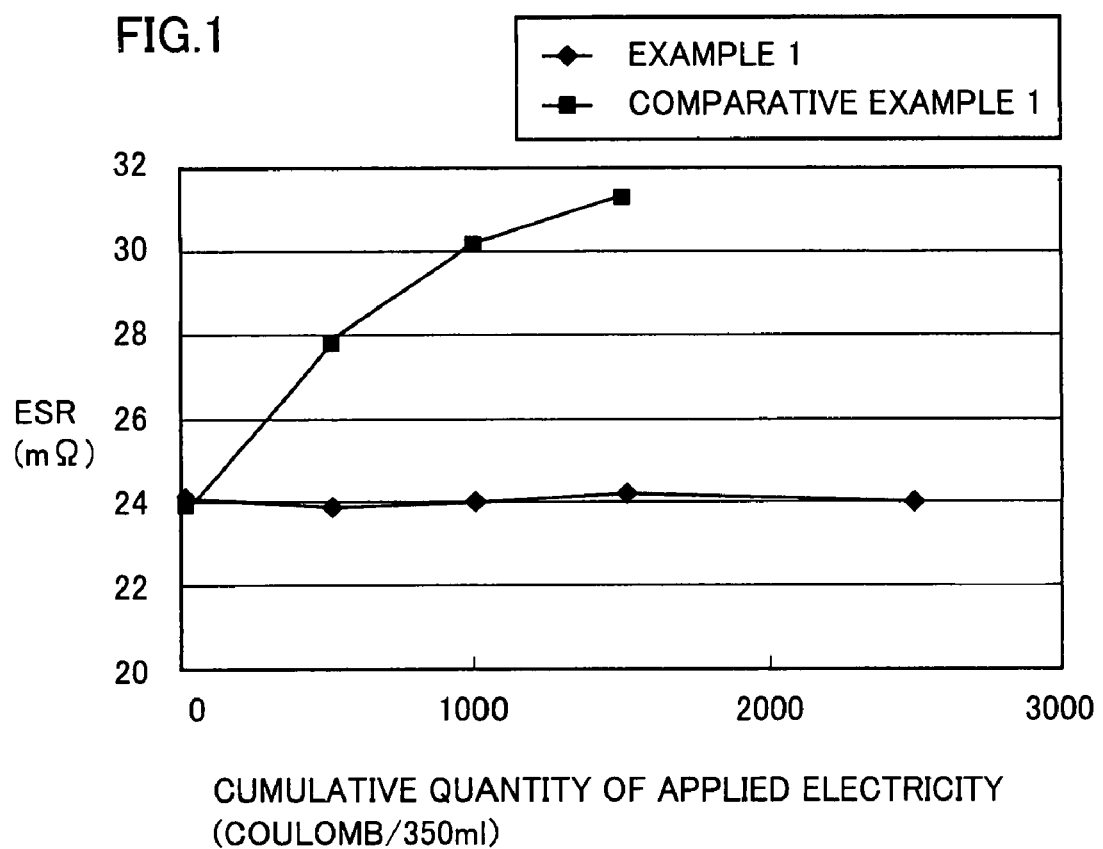

METHOD OF MANUFACTURING SOLID ELECTROLYTIC CAPACITOR

BACKGROUND OF THE INVENTION

1. Field of the Invention

The present invention relates to a solid electrolytic capacitor having an anode element made of a valve metal, a dielectric layer formed on a surface of the anode element, and a cathode layer including an electrically conductive polymer layer and formed on the dielectric layer.

2. Description of the Background Art

Regarding a solid electrolytic capacitor having an anode element made of a valve metal, a dielectric layer formed on a surface of the anode element, and a cathode layer including an electrically conductive polymer layer and formed on the dielectric layer, the chemical oxidative polymerization method and the electrolytic oxidative polymerization method have conventionally been known as a method of forming the conductive polymer layer. Here, the chemical oxidative polymerization method refers to a method of producing a polymer by allowing an oxidizing agent to act on a monomer to chemically oxidize and polymerize the monomer, and the electrolytic oxidative polymerization method refers to a method of producing a polymer by passing an electric current through a solution containing a monomer to electrolytically oxidize and polymerize the monomer. Generally, the electrolytic oxidative polymerization method uses a more complicated manufacturing apparatus. However, control of conditions for polymerization by the electrolytic oxidative polymerization method is easier as compared with the chemical oxidative polymerization method. Therefore, an electrically conductive polymer excellent in electrical conductivity, mechanical strength and homogeneity is produced more easily by the former method.

In order to form the electrically conductive polymer layer forming a main portion of the cathode layer by means of the electrolytic oxidative polymerization method, a first cathode layer is formed on the dielectric layer and the electrically conductive polymer layer that is a second cathode layer is formed on the first cathode layer by the electrolytic oxidative polymerization method. The first cathode layer is formed of a manganese dioxide layer produced by pyrolysis of manganese nitrate or an electrically conductive polymer layer produced by the chemical oxidative polymerization method. The second cathode layer is formed using the first cathode layer as an anode and a metal plate as a cathode and passing an electric current through a solution containing a monomer and a substance serving as a supporting electrolyte as well as a dopant agent (electrolytic polymerization solution).

In the process step of forming the electrically conductive polymer layer by the electrolytic oxidative polymerization method, as the polymerization is continued or repeated in the electrolytic polymerization solution, the monomer is consumed and the supporting electrolyte is also consumed by being taken as a dopant into the polymer. As the supporting electrolyte, a metal salt of an aromatic sulfonic acid for example is used. In the case where the anion of the supporting electrolyte salt is taken as a dopant into the polymer, it is called p-type doping. In the case where the cation of the supporting electrolyte salt is taken as a dopant into the polymer, it is called n-type doping. Generally it is considerably difficult to accomplish the n-type (cation) doping and thus usually the p-type doping is widely employed.

As for the p-type doping, the anion is taken as a dopant into the polymer. Therefore, the cation is left in the electrolytic polymerization solution to cause the pH of the solution to gradually change to become more basic. This results in the harmful effects that the electrical conductivity of the produced electrically conductive polymer is decreased and the ESR (Equivalent Series Resistance) of the resultant electrolytic capacitor is increased. On the contrary, the n-type doping causes the cation to be taken as a dopant into the polymer. Thus, the anion is left in the electrolytic polymerization solution and the pH of the solution is changed to gradually become acidic. In this case as well, some harmful effects could be caused.

As a solution to the problems as described above, the technique of adding such a pH adjusting agent as sulfuric acid to the electrolytic polymerization solution is disclosed in Japanese Patent Laying-Open No. 11121279.

However, even when the method of adjusting the pH by adding the sulfuric acid is used, continued use of the electrolytic polymerization solution causes the sulfate anion concentration in the electrolytic polymerization solution to cumulatively increase, which makes it difficult to control the ratio between aromatic sulfonic acid ions and sulfate ions taken as dopants into the polymer. Further, degradation of the electrolytic polymerization solution becomes worse and the ESR of the electrolytic capacitor increases. Therefore, the whole solution has to be replaced regularly.

SUMMARY OF THE INVENTION

In view of the problems as described above, the present invention provides a method of manufacturing a solid electrolytic capacitor for which the electrolytic polymerization solution can be used semipermanently while preventing a decrease of the electrical conductivity of the electrically conductive polymer layer and an increase of the ESR of the resultant electrolytic capacitor due to degradation of the electrolytic polymerization solution.

The present invention provides a method of manufacturing a solid electrolytic capacitor including the steps of: (A) forming a dielectric layer on a surface of an anode element made of a valve metal; (B) forming a cathode layer including an electrically conductive polymer layer on the dielectric layer; and (C) adjusting pH of a solution that contains a monomer and a dopant agent and that is used in forming the electrically conductive polymer layer, by allowing the solution to contact an ion exchange or ion capture substance.

According to the method of manufacturing the solid electrolytic capacitor of the present invention, preferably the dopant agent is a salt including a cation or anion taken as a dopant into the electrically conductive polymer layer and a counterion of the cation or anion, and in the step (C), the solution is allowed to contact the ion exchange or ion capture substance to exchange or capture the counterion and thereby adjust the pH of the solution.

Further, according to the method of manufacturing the solid electrolytic capacitor of the present invention, preferably in the step (B), the electrically conductive polymer layer is formed by applying electricity to the solution to electrolytically oxidize and polymerize the monomer and taking in the dopant from the dopant agent. Preferably, after the application of the electricity is continued or repeated, the application of the electricity is stopped and, in the step (C), the solution is allowed to contact the ion exchange or ion capture substance to cause the pH of the solution to become closer to a pH value before the application of the electricity.

Alternatively, in the step (B), preferably the electrically conductive polymer layer is formed by applying electricity to the solution to electrolytically oxidize and polymerize the monomer and taking in the dopant from the dopant agent.

Preferably, during the application of the electricity, in the step (C), the solution is allowed to contact the ion exchange or ion capture substance to continuously suppress a change in pH of the solution.

Here, the pH may be adjusted in the step (C) by supplying into the solution the ion exchange or ion capture substance enclosed in a material passing the solution therethrough.

Alternatively, the pH may be adjusted by supplying the solution to an apparatus containing the ion exchange or ion capture substance and collecting the solution.

In accordance with the present invention, the electrolytic polymerization solution can be recycled endlessly and thus losses of the monomer and the supporting electrolyte included in the waste liquid are eliminated. Therefore, such effects are obtained as reduction in cost of chemical agents, in cost of waste liquid treatment, in environmental load, and in number of process steps for preparing the polymerization solution.

Regarding the conventional method, degradation of the solution causes the ESR to gradually increase, resulting in difference in ESR between the capacitor before the whole solution is replaced and the capacitor after the whole solution is replaced. In contrast, the present invention does not require the replacement of the whole solution. The ESR does not increase and thus the above-described difference in ESR is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a graph showing changes of the ESR of an example of the present invention and a comparative example.

DESCRIPTION OF THE PREFERRED EMBODIMENTS

In the following, an embodiment of the present invention is described. According to a method of manufacturing a solid electrolytic capacitor of the present invention, on a peripheral surface of an anode element made of a valve metal and having an anode lead, a dielectric oxide film is formed (step (A)). Further, on the dielectric oxide film, a cathode layer made of such a solid electrolyte as electrically conductive polymer is formed (step (B)) and successively a cathode lead-out layer is formed thereon to form the solid electrolytic capacitor element. Here, the valve metal refers to a metal forming a closely-packed and durable dielectric oxide film, and specifically refers to such a metal as tantalum, niobium, aluminum or titanium.

Regarding step (B) mentioned above, as a method of forming the cathode layer of the conductive polymer on the dielectric oxide film, the chemical oxidative polymerization or electrolytic oxidative polymerization may be employed. The layer formed by the electrolytic oxidative polymerization is more preferable than the layer formed by the chemical oxidative polymerization only, since the former layer has a higher strength and a higher electrical conductivity and is a homogeneous and high-quality layer. Therefore, it is more preferable to use the electrolytic oxidative polymerization.

An electrolytic polymerization solution that is used in forming the cathode layer of the electrically conductive polymer by the electrolytic oxidative polymerization contains a monomer that may become an electrically conductive polymer, an appropriate supporting electrolyte and such an additive as surface-active agent. As the supporting electrolyte, preferably a metal salt of an aromatic sulfonic acid such as a sodium salt of an aromatic sulfonic acid is used. The supporting electrolyte also acts as a dopant agent. An anion or cation in the supporting electrolyte salt is taken as a dopant into the electrically conductive polymer when the cathode layer is formed by the electrolytic oxidative polymerization. In the electrolytic polymerization solution, the pH value is varied due to an increase in concentration of counterions of the anion or cation taken into the electrically conductive polymer as the quantity of applied electricity increases. According to the present invention, the varied pH value is adjusted by means of an ion capture substance or ion exchange substance (step (C)). When such a salt as described above is used as the supporting electrolyte (dopant agent), the ion capture substance or ion exchange substance captures or exchanges the counterion of the anion or cation taken into the electrically conductive polymer. Here, the ion capture or ion exchange substance refers to a substance that captures the ion in the electrolytic polymerization solution or exchanges the ion in the electrolytic polymerization solution with an ion of the same charge type, and specifically refers to such a substance as cation exchange resin, anion exchange resin or chelating resin for example.

Step (C) of adjusting the pH of the electrolytic polymerization solution may be carried out by stopping continued or repeated application of an electric current and thereafter allowing the solution to contact the ion capture or ion exchange substance. In this case, the pH is adjusted so that the pH is closer to the pH value before the electric current is applied or the pH is substantially equal to the pH before the electric current is applied. Further, step (C) of adjusting the pH of the electrolytic polymerization solution may be carried out by allowing the solution to contact the ion capture or ion exchange substance while the electric current is applied. In this case, the pH is adjusted so that any change of the pH of the electrolytic polymerization solution is continuously suppressed.

In the case where the electrically conductive polymer is polypyrrole, the pH of the electrolytic polymerization solution is preferably adjusted for example to 5 to 8. The target value of the adjustment of the pH, however, is not limited to a particular one.

A specific method of adjusting the pH using the ion capture or exchange substance includes, for example, a method according to which the ion capture or ion exchange substance is enclosed in a material that passes the electrolytic polymerization solution therethrough and the enclosed ion capture or ion exchange substance is supplied into the electrolytic polymerization solution, and a method according to which the electrolytic polymerization solution is supplied to an apparatus containing the ion capture or ion exchange substance and the treated electrolytic polymerization solution is collected. Here, the material passing the electrolytic polymerization solution therethrough refers to, for example, gauze.

The electrolytic oxidative polymerization is performed in the way as described above to form the cathode layer including the electrically conductive polymer layer. After this, on the peripheral surface of the cathode layer, the cathode lead-out layer formed of a carbon layer and a silver paste layer is formed and thus the solid electrolytic capacitor element is produced.

Using the solid electrolytic capacitor element produced through the above-described process steps, an anode lead and a cathode lead are drawn out respectively from the anode element and the cathode lead-out layer, these are coated with an epoxy resin or the like and aged. In this way, the solid electrolytic capacitor of the present embodiment is completed.

It should be noted that the constituent elements of the present invention are not limited to those of the above-described embodiment, and may be subjected to various modifications within the technical scope of the claims. For example, if the electrically conductive polymer is polyaniline, the pH of the electrolytic polymerization solution in the electrolytic oxidative polymerization step has to be kept at no more than 6, since polyaniline shows electrical conductivity only in the case of polymerization in an acidic solution. Thus, the range of the pH that should be maintained in the electrolytic polymerization solution has to be changed depending on an electrically conductive polymer produced by polymerization. Further, since the present invention relates to a method of forming a cathode, the method can be applied regardless of the type of the anode, namely the type of the anode may be a sintered body of tantalum, aluminum foil stack, or the like instead of niobium.

In the following, the present invention is described in more detail in connection with examples and comparative examples. The present invention, however, is not limited to them.

EXAMPLES

Example 1

First, a sintered body of niobium (Nb) was immersed in an aqueous solution of phosphoric acid, and a DC voltage was applied to perform anodic oxidation and thereby form a dielectric oxide film on a surface of the Nb sintered body. Next, on a surface of the dielectric oxide film, a first cathode layer of polypyrrole was formed by the chemical oxidative polymerization method. Then, in order to perform electrolytic oxidative polymerization, an electrolytic polymerization solution (350 ml) was prepared that contained a pyrrole monomer, a sodium salt of an aromatic sulfonic acid (sodium naphthalene sulfonate) as the supporting electrolyte, and a trace amount of sulfuric acid and that had its pH adjusted to 5.0. The electrolytic oxidative polymerization was thus performed to form an electrolytic oxidative polymerization layer made of polypyrrole on a surface of the first cathode layer and thereby complete a capacitor of the first process.

Further, the same electrolytic polymerization solution was used to continue the process by successively replacing the capacitor element, and the cumulative quantity of applied electricity in the electrolytic polymerization solution was increased. In this process, when the pH of the electrolytic polymerization solution reached 8.0, the application of electricity was stopped. The pyrrole monomer and the supporting electrolyte were added so that the pyrrole concentration and the supporting electrolyte concentration were specified concentrations respectively, and a cation exchange resin enclosed in a material passing the electrolytic polymerization solution therethrough was supplied to lower the pH to 5.0. Then, the electrolytic oxidative polymerization process was continued, and the series of process steps was repeated. In this process, the sulfate anion concentration in the electrolytic polymerization solution was measured at respective points of time when the cumulative quantity of applied electricity was 500 coulombs, 1000 coulombs, 1500 coulombs and 2500 coulombs respectively, the element treated at each point of time was completed as a capacitor, and the ESR characteristic was measured.

Comparative Example 1

A capacitor element similar to that of Example 1 was fabricated. The electrolytic oxidative polymerization was repeated similarly to Example 1 except that the cation exchange resin was not used for the treatment and a sulfuric acid was added to adjust the pH to 5.0. In the process, at respective points of time when the cumulative quantity of applied electricity was 500 coulombs, 1000 coulombs and 1500 coulombs, the sulfate anion concentration in the electrolytic polymerization solution and the ESR characteristic of the capacitor element were measured.

In Tables 1 and 2, the ESR and the sulfate anion concentration of Example 1 and Comparative Example 1 as compared with each other are shown.

TABLE 1

| | cumulative quantity of applied electricity (coulomb) | | | | |
|---|---|---|---|---|---|
| | 1st time | 500 | 1000 | 1500 | 2500 |
| ESR of Example 1 (mΩ) | 24.2 | 23.9 | 24.0 | 24.1 | 24.1 |
| ESR of Comparative Example 1 (mΩ) | 24.0 | 27.8 | 30.1 | 31.2 | — |

TABLE 2

| | cumulative quantity of applied electricity (coulomb) | | | | |
|---|---|---|---|---|---|
| | 1st time | 500 | 1000 | 1500 | 2500 |
| sulfate anion concentration of Example 1 (ppm) | 22 | 22 | 21 | 21 | 21 |
| sulfate anion concentration of Comparative Example 1 (ppm) | 21 | 150 | 280 | 410 | — |

FIG. 1 shows a graph illustrating changes of the ESR with respect to the quantity of applied electricity in Example 1 and Comparative Example 1.

As seen from Table 1 and FIG. 1, the present example adjusting the pH by the cation exchange resin provides the ESR that is substantially the same value for the capacitor subjected to the electrolytic oxidative polymerization using a new electrolytic polymerization solution and for any capacitor subjected to the electrolytic oxidative polymerization using the electrolytic polymerization solution after application of electric current is repeated. In contrast, the comparative example adjusting the pH by the sulfuric acid provides the ESR that gradually increases as the quantity of applied electricity increases. It is seen from the above that the treatment by means of the cation exchange resin provides a more favorable and stable ESR.

Although the reason for this is not clear, from a comparison between the example and the comparative example in which the process was performed until the cumulative quantity of applied electricity reached 1500 coulombs, it was found that, when the wavelength was 600 nm, the absorptivity of the electrolytic polymerization solution of the example was 62% while that of the comparative example was 78%, and the ratio between the example and the comparative example was 79%.

In the case where the wavelength was in the range from 400 nm to 900 nm corresponding to the upper limit of observation, the aforementioned ratio was substantially the same and no singular point was found at any specific wavelength. From this fact, it is considered that a main factor of the difference in optical absorption is the concentration of oligomer generated by the polymerization and the method of the present invention is smaller in amount of generated oligomer. The generation of oligomer seems to have a close relation with generation of "branched polymer" having a low electrical conductivity, and thus the oligomer generation seems to have a cause-and-effect relation with the magnitude of ESR. As shown in Table 2, the example provides the sulfate anion concentration that does not change all the time, while the comparative example provides the sulfate anions accumulated to increase the concentration thereof. It is presumed that this fact has any relation with the generation of branched polymer, resulting in the increase in ESR.

As for the method of the comparative example described above, when the cumulative quantity of applied electricity reaches a certain value, the whole electrolytic polymerization solution has to be discarded and replaced with a new one. Before and after the discard and replacement, product characteristics are different. For example, when the whole electrolytic polymerization solution of 350 ml is replaced when the cumulative quantity of applied electricity is 500 coulombs, the ESR before the replacement and the ESR after the replacement are different by approximately 4 m$\Omega$ (see Table 1). In contrast, according to the method of the present invention, replacement of the electrolytic polymerization solution is unnecessary and thus no ESR difference occurs. Accordingly, the ESR that is low and stable all the time can be achieved.

While the cation exchange resin used for adjusting the pH causes adsorption of sodium ions, the cation exchange resin is returned to the original state by being treated by a sulfuric acid. Therefore, use of the cation exchange resin can be repeated any number of times. Thus, there is no consumption of ion exchange resin and an ideal recycle system can be established.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a solid electrolytic capacitor comprising the steps of:
    (A) forming a dielectric layer on a surface of an anode element made of a valve metal;
    (B) forming a cathode layer including an electrically conductive polymer layer on said dielectric layer; and
    (C) adjusting pH of a solution that contains a monomer and a dopant agent and that is used in forming said electrically conductive polymer layer, by allowing the solution to contact an ion exchange or ion capture substance, wherein
    said dopant agent is a salt including a cation or anion taken as a dopant into said electrically conductive polymer layer and a counterion of the cation or anion, and
    in said step (C), said solution is allowed to contact said ion exchange or ion capture substance to exchange or capture said counterion and thereby adjust the pH of the solution.

2. The method of manufacturing a solid electrolytic capacitor according to claim 1, wherein
    in said step (B), said electrically conductive polymer layer is formed by applying electricity to said solution to electrolytically oxidize and polymerize said monomer and taking in the dopant from said dopant agent, and
    after the application of the electricity is continued or repeated, said application of the electricity is stopped and, in said step (C), said solution is allowed to contact said ion exchange or ion capture substance to cause the pH of the solution to become closer to a pH value before said application of the electricity.

3. The method of manufacturing the solid electrolytic capacitor according to claim 2, wherein said pH is adjusted by supplying into said solution said ion exchange or ion capture substance enclosed in a material passing said solution therethrough.

4. The method of manufacturing the solid electrolytic capacitor according to claim 2, wherein said pH is adjusted by supplying said solution to an apparatus filled with said ion exchange or ion capture substance and collecting said solution.

5. The method of manufacturing the solid electrolytic capacitor according to claim 1, wherein
    said step (B), said electrically conductive polymer layer is formed by applying electricity to said solution to electrolytically oxidize and polymerize said monomer and taking in the dopant from said dopant agent, and
    during the application of the electricity, in said step (C), said solution is allowed to contact said ion exchange or ion capture substance to continuously suppress a change in pH of the solution.

6. The method of manufacturing the solid electrolytic capacitor according to claim 5 wherein said pH is adjusted by supplying into said solution said ion exchange or ion capture substance enclosed in a material passing said solution therethrough.

7. The method of manufacturing the solid electrolytic capacitor according to claim 5 wherein said pH is adjusted by supplying said solution to an apparatus containing said ion exchange or ion capture substance and collecting said solution.

* * * * *